United States Patent [19]

Gamberini

[11] Patent Number: 4,542,835
[45] Date of Patent: Sep. 24, 1985

[54] METHOD FOR FILLING CONTAINERS WITH METERED QUANTITIES OF POWDERED MATERIALS

[75] Inventor: Ernesto Gamberini, Rostignano-Pianoro, Italy

[73] Assignee: MG2 S.p.A., Pian di Macina, Italy

[21] Appl. No.: 470,957

[22] Filed: Mar. 1, 1983

[30] Foreign Application Priority Data

Mar. 3, 1982 [IT] Italy .................. 3355 A/82

[51] Int. Cl.$^4$ .............................................. B65B 1/04
[52] U.S. Cl. ...................................... 222/1; 222/168.5; 222/218; 141/12; 141/71; 141/144; 141/258
[58] Field of Search ............... 222/168.5, 216-218, 222/221, 1; 141/67, 71, 81, 144-147, 12, 249, 258, 238, 242; 425/344, 345, 436 R, 438, 444

[56] References Cited

U.S. PATENT DOCUMENTS

| | | | |
|---|---|---|---|
| 2,941,698 | 6/1960 | Fowler et al. | 222/216 |
| 3,565,132 | 2/1971 | Lefort | 222/218 X |
| 3,587,671 | 6/1971 | Gamberini | 222/168.5 X |
| 3,847,191 | 11/1974 | Aronson | 141/67 X |
| 4,062,386 | 12/1977 | Zanasi | 141/258 |
| 4,116,247 | 9/1978 | Zanasi | 141/81 X |
| 4,244,404 | 1/1981 | Brockner et al. | 222/168.5 X |
| 4,341,244 | 7/1982 | Facchini | 141/258 X |

FOREIGN PATENT DOCUMENTS 2204500   8/1972   Fed. Rep. of Germany ........ 222/52

*Primary Examiner*—F. J. Bartuska
*Assistant Examiner*—Kevin P. Shaver
*Attorney, Agent, or Firm*—Frost & Jacobs

[57] ABSTRACT

The present invention concerns a method for obtaining a uniform dose for filling containers with metered quantities of powdered materials. The powdered materials are drawn from a rotating container by a plurality of dosing devices which are advanced by a conveyor along a predetermined path, at least a portion of which extends above the movable container. Each of the dosing devices comprises a tubular punch vertically movable relative to the movable container and to the conveyor. A piston reciprocates inside each tubular punch. The punch has an open end facing the movable container to define within the punch a variable volume dosing chamber. The method comprises locating the punches which are positioned above the movable container so that they are substantially in contact with the powdered material inside the movable container, wherein the piston positioned within each punch is arranged inside each punch so as to block the interior volume of the dosing chamber at the open end of the punch, and increasing the volume of the dosing chamber to a predetermined maximum by moving the punch relative to the piston toward the bottom of the movable container thereby allowing the powdered material to fill the dosing chamber to obtain a uniform dose.

6 Claims, 3 Drawing Figures

METHOD FOR FILLING CONTAINERS WITH METERED QUANTITIES OF POWDERED MATERIALS

BACKGROUND OF THE INVENTION (1) Field of the Invention

The present invention relates to the method for filling containers, in particular capsules comprising a bottom portion and a lid portion, with metered quantities of powdered materials, in particular, pharmaceutical materials.

(2) Prior Art

In general, capsules are filled with powder drawn from a supply trough by means of respective dosing devices, each comprising a tubular vertical punch. Inside the tubular vertical punch is an ejection piston slidably mounted for reciprocating movement. Each ejection piston is moved, in use, relative to the respective punch between a lower position, in which a lower end of the piston is flush with the lower open end of the punch, and an upper position, in which the lower end of the piston is arranged above the lower end of the punch so as to define, inside the tubular punch, a dosing chamber. In other words, the lower end of the punch, which is normally open, is closed by the piston during operation. Moreover, in use, each dosing device is moved axially between an upper position, in which the lower end of the punch is arranged above the upper surface of the powder in the supply trough and a lower position, in which the lower end of the punch is arranged in contact with the bottom of the supply trough.

In the known filling devices for capsules, each dosing device is normally advanced transversally of its vertical axis, which is generally a circular path extending along the periphery of a conveying drum. The conveying drum is mounted for rotation about a vertical axis and is provided with a plurality of equally spaced vertical through bores, each of which is slidably engaged by a punch of a respective dosing device. The above rotary drum is arranged above a rotary container, which defines the aforementioned supply trough, and is rotated, in use, at substantially the same speed as the above conveying drum.

In this known filling devices for capsules, each dosing device operates as follows: at the beginning, each dosing device is advanced by the conveying drum with the punch arranged in its upper position and above the upper surface of the powder in the rotary container, and with its piston arranged in its upper position relative to the punch so as to define therein the aforementioned dosing chamber. Upon reaching a predetermined position, each dosing device, while being advanced by the conveying drum, is moved downward to its lower position, with its piston remaining in the upper position relative to the punch. This downward movement results in the dosing chamber being substantially filled up with powder. The piston is then moved slightly downward relative to the punch toward its lower position, with the punch remaining in its lower position in contact with the bottom of the rotary container, so as to compact the powder within the dosing chamber. The dosing device is then moved upward to its upper position together with the compacted powder dose inside its dosing chamber. The piston is finally moved downward relative to the punch to its lower position to reduce the volume of the dosing chamber to zero and eject the compacted powder dose at a loading position. The loading position is where the bottom portion of the capsules to-be-filled are advanced. In this way, the bottom portion of each capsule is filled in succession with respective powder doses at the loading position. The bottom portion of each capsule is then advanced to a closing position where each bottom portion is closed by a respective lid portion.

The known filling sequence described above suffers from a major drawback in that some air remains normally trapped inside the dosing chamber when, at the beginning of the sequence, the dosing device is lowered into the powder to its lower position with the piston arranged in its upper position inside the punch. Owing to a portion of the dosing chamber being occupied by air, the final compacted powder dose may not correspond to the predetermined dose to be obtained.

According to U.S. Pat. No. 3,847,191, the above problem is solved by making either each piston or the bottom of the rotary container of porous material, and by applying a suction through the porous material when the powder is being compacted inside the dosing chamber so as to extract the trapped air therefrom.

The above solution, though very ingenious, is not very often employed due to the cost involved; to the relatively low mechanical resistance of the porous material used; and above all, to the fact that very fine powders tend to pass through the porous material and pullute the ambient environment.

SUMMARY OF THE INVENTION

The present invention provides a solution to the above problem by preventing air from being trapped inside the dosing chamber.

The above solution is attained by the method of the present invention since it provides a filling sequence, which differs from the known sequence described above in that, at the beginning, each dosing device is arranged above the free surface of the powder inside the rotary container with its punch in its upper position. Additionally, the piston is in its lower position relative to the punch so as to be arranged with its lower end flush with the lower end of the respective punch and substantially in contact with the free surface of the powder inside the rotary container. Therefore, at the beginning, the dosing chamber has a zero volume, and its volume is progressively increased from zero to a maximum by moving the punch downward into its lower position in contact with the bottom of the rotary container. The piston maintains its vertical position relative to the rotary container during the downward movement of the punch. In this way, any increase in volume of the dosing chamber corresponds to an equal volume of powder entering the dosing chamber so that, in the end, no air enters the chamber.

It is important to note that the above result is attained by the present invention with a very simple and inexpensive modification of known filling devices for capsules.

BRIEF DESCRIPTION OF THE DRAWINGS

The invention will be described by way of example with reference to the accompanying drawings, in which.

DETAILED DESCRIPTION OF THE INVENTION

Figure 1:
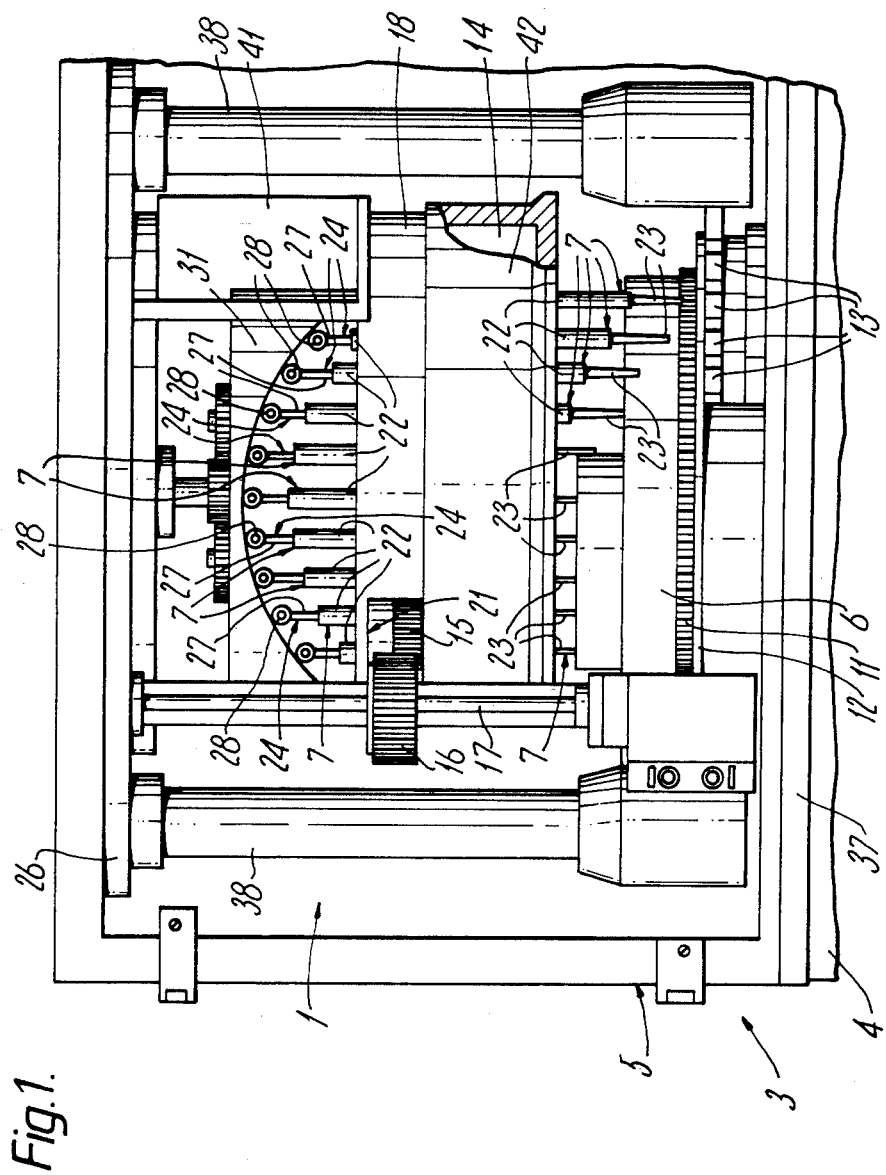
FIG. 1 is a partial lateral view of a filling machine for capsules operating according to the method of the present invention.

FIG. 1 shows a machine for filling capsules (not shown) having a bottom portion and a lid portion, with metered quantities of a powder 2. Filling machine 1 is supported by a frame 3 comprising a base 4 and a protecting structure 5 enclosing machine 1. Protecting structure 5 comprises a base wall 37 supported by base 4 and extending under machine 1; an upper wall 26 arranged above machine 1; three vertical pylons 38 extending from base wall 37 for supporting upper wall 26; a pair of semi-cylindrical lateral covering elements 41 made of transparent material and extending downward from upper wall 26; and a cylindrical vertical protecting band 18 connected to the lower end of the covering elements 41.

Figure 2:
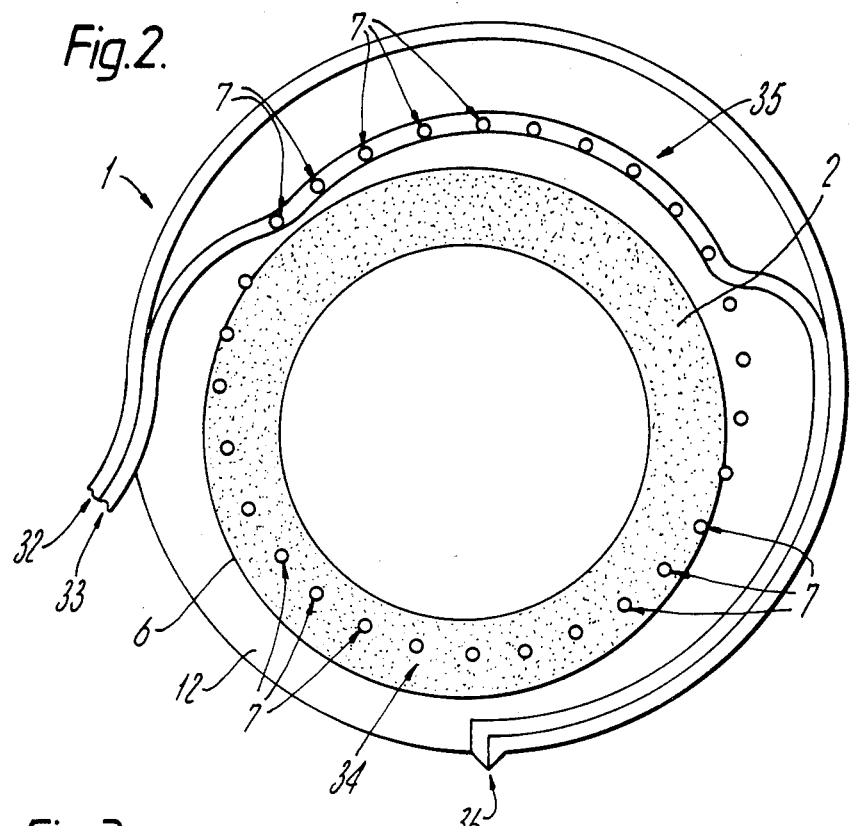
FIG. 2 is a plan diagrammatical view of the operation of the machine of FIG. 1.

With reference to FIGS. 1 and 2, machine 1 comprises a first block conveyor 13 extending along a horizontal path indicated at 33 in FIG. 2 and formed by a plurality of equally spaced blocks each defining a seat (not shown) for a respective bottom portion (not shown) of a capsule. Machine 1 further comprises a second conveyor 12 consisting of a rotary vertical cylinder arranged above conveyor 13 and provided with a plurality of through holes (not shown) arranged along a circular path indicated at 32 in FIG. 2, and each defining a seat (not shown) for a respective lid portion (not shown) of a capsule.

Machine 1 further comprises a rotary annular container 6 for a layer of powder 2. The thickness of the layer is kept constant during use in a known manner by means of a known leveling device (not shown). Container 6 is provided with an outer horizontal crown gear 11, which is engaged by a driving pinion (not shown).

Above rotary container 6, a drum 14 is arranged which is mounted for rotation about a vertical axis and positioned eccentrically relative to the axis of rotation of container 6. Drum 14 is provided with an outer crown gear 15, which is protected by band 18, and which is engaged through a lateral window 21 of band 18 by a pinion 16 driven by a drive shaft 17.

Drum 14 is a conveyor for a plurality of equally spaced vertical dosing devices 7 which, as shown in FIG. 2, are arranged along a circular advancement path, only a portion 34 of which extends directly above container 6, whereas the remaining portion 35 extends laterally outside container 6.

Each dosing device 7 comprises a cylindrical hollow body 22, a lower external frusto-conical portion which defines a vertical tubular punch 23, inside which a piston 24 is slidably mounted. Piston 24 comprises a lower head 25 and an upper end portion 27. The upper end portion 27 extends outside and above the upper end of hollow body 22 and is provided with a cam follower 28. The cam follower 28 is in contact with a cam 31 supported by wall 26 in a vertically adjustable manner (not shown).

Each cam follower 28 is kept constantly in contact with cam 31 by a spring (not shown) interposed between the relevant piston 24 and the relevant hollow body 22 in a known manner such as that described in U.S. Pat. No. 4,116,247. The vertical position of each body 22 relative to conveying drum 14 is controlled in a known manner by a cam (not shown) defined by an annular slot (not shown) engaged by a cam follower (not shown) extending laterally from body 22 itself. An example of such a control cam, slot and cam follower is shown in FIG. 4 of the aforementioned U.S. Pat. No. 3,847,191.

Figure 3:
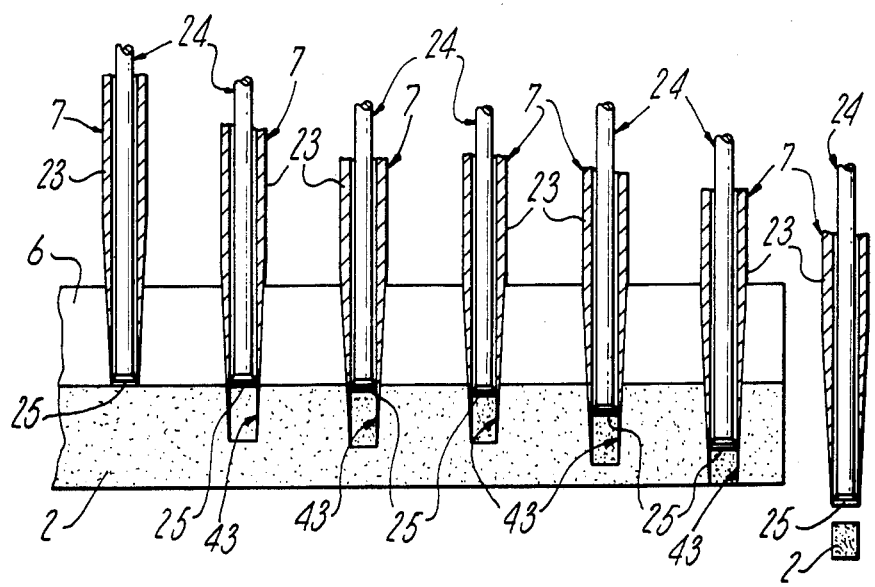
FIG. 3 is a side diagrammatical view of the filling sequence performed by the machine of FIG. 1.

The shape of cam 31 and of the cam (not shown) controlling the vertical position of each body 22 are not shown since they may be immediately and very easily derived, by any man skilled in the art, from the following description, made with reference to FIGS. 2 and 3, of the filling sequence performed by each dosing device 7 during each complete revolution about the axis of conveying drum 14.

As shown in FIG. 2, the path 33 followed by all the bottom portions of the capsules comprises an inlet portion extending alongside a segment of path 32, an intermediate portion 35 of the path 33 which is also followed by dosing devices 7, and an outlet portion again extending alongside a segment of path 32. The outlet portion leads to an area 36 where each bottom portion of the capsule is closed by a respective lid portion, by means of a closing device 42 of a known type and supported by a drum 14.

The filling sequence is now described with reference to FIG. 3 from the movement in which a dosing device 7, advanced by drum 14 rotating in a counterclockwise direction in FIG. 2, leaves portion 34 of its circular path and enter intermediate portion 35 of the same.

When entering portion 34, dosing device 7 is arranged above the free surface of powder 2 in container 6, and the lower end of head 25 of piston 24 is arranged flush with the lower end of the punch 23. Dosing device 7 is then lowered towards powder 2 with its piston 24 and punch 23 maintaining the relative position described above until punch 23 and head 25 are brought into contact with the upper surface of powder 2. From this moment on, the downward movement of piston 24 is stopped, whereas punch 23 proceeds further down punching into the powder. This relative movement between punch 23 and piston 24 causes the formation inside punch 23, of a dosing chamber 43, the volume of which increases with the downward movement of punch 23 into powder 2, from zero to a maximum. The dosing chamber 43 is occupied by powder 2 immediately as such volume is formed.

Due to the lower end of punch 23 being flush with head 25 and the upper surface of powder 2, no air can enter chamber 43 except that which is already mixed with powder 2 inside container 6.

After formation of chamber 43 and of a powder dose inside chamber 43, punch 23 and piston 24 are moved downward simultaneously until the lower end of punch 23 contacts the bottom of container 6. The powder dose inside the chamber 43 is then compressed against the bottom of container 6 by further downward movement of piston 24 relative to punch 23. Punch 23 and piston 24 are then lifted, together with the compressed powder dose inside chamber 43, above container 6 before dosing device 7 reaches the intermediate portion 35 of its circular advancement path.

When moving along the path of intermediate portion 35, punch 23 and piston 24 are moved together downward towards conveyor 13. Piston 24 is then moved downward relative to its punch 23 unitl head 25 reaches the lower end of punch 23 to eject the compressed powder dose and deliver it into a bottom portion of a capsule advanced by conveyor 13. Dosing device 7 is then lifted above the level of container 6 and is maintained in this lifted position until it reaches portion 34 of its circular advancement path to repeat the filling sequence described above.

Preferably, after formation of dosing chamber 43, and before compression of the powder dose against the bottom of container 6, the volume of chamber 23 is slightly reduced by moving piston 24 downward to expel any air which may be mixed with powder 2 inside container 6.

Preferably, when reaching path portion 34 and before starting the filling sequence, piston 24 is reciprocated inside punch 23 to cause any powder still adhering to punch 23 to fall into container 6.

Preferably, rotary container 6 is rotated about its axis at a speed which is slightly different from the speed of rotation of drum 14 so as to prevent each punch 23 from always being plunged into the same position of container 6. This aids the leveling device (not shown) in maintaining a uniform level of powder.

I claim:

1. A method of obtaining a uniform dose for filling containers, in particular bottom portions of capsules, with metered quantities of powdered materials, in particular pharmaceutical materials, drawn from a rotating movable container having a bottom by means of a plurality of dosing devices which are advanced by conveyor means along a path, at least a portion of said path extends above said movable container, each of said dosing devices comprising a tubular punch vertically movable relative to said movable container and to said conveyor means, and a piston reciprocating inside said tubular punch, said punch having an open end facing said movable container to define within said punch a variable volume dosing chamber; the method comprising, for each of said dosing devices, the steps of locating said punch substantially in contact with said powdered material inside said movable container, said piston being positioned inside said punch so as to define a zero volume dosing chamber; and increasing said volume of said dosing chamber from zero to a predetermined maximum by moving said punch relative to said piston toward said bottom of said movable container, thereby allowing said powdered material to fill said dosing chamber to obtain a uniform dose.

2. A method as claimed in claim 1, wherein said conveying means and said movable container are moved at different speeds.

3. A method as claimed in claim 1, further comprising the steps of bringing said punch into contact with said bottom and moving said piston relative to said punch toward said bottom to reduce the volume of said dosing chamber, thereby compressing said dose.

4. A method as claimed in claim 3, wherein before said punch touches said bottom, said punch is moved toward said bottom with said piston to substantially eliminate most of the air within said dosing chamber said piston being moved at a speed higher than that of said punch.

5. A method as claimed in claim 1, further comprising the steps of extracting said dosing device from said powdered material in said movable container with said dose inside said dosing chamber, and moving said piston relative to said punch to reduce the volume of said dosing chamber to zero to eject said dose.

6. A method as claimed in claim 5, comprising the further step of reciprocating said piston within said punch to dislodge any powdered material adhering to said dosing device.

* * * * *